United States Patent [19]

Sabri et al.

[11] Patent Number: 4,782,387
[45] Date of Patent: Nov. 1, 1988

[54] TWO-CHANNEL CODING OF DIGITAL SIGNALS

[75] Inventors: Mohamed S. Sabri, Beaconsfield; Albert Golembiowski, Nuns' Island; Birendra Prasada, Westmount, all of Canada

[73] Assignee: Northern Telecom Limited, Montreal, Canada

[21] Appl. No.: 939,983

[22] Filed: Dec. 9, 1986

[51] Int. Cl.[4] .............................................. H04N 7/12
[52] U.S. Cl. ..................... 358/133; 358/135; 358/138; 358/12; 375/28; 341/88
[58] Field of Search ............... 358/133, 138, 135, 12, 358/136; 375/27, 28, 33; 340/347 DD

[56] References Cited

U.S. PATENT DOCUMENTS

| | | | |
|---|---|---|---|
| 2,605,361 | 7/1952 | Cutler | 375/28 |
| 2,905,756 | 9/1959 | Graham | 358/135 |
| 4,568,916 | 2/1986 | Bahgat | 340/347 DD |
| 4,580,129 | 4/1986 | Bahgat | 340/347 DD |
| 4,661,862 | 4/1987 | Thompson | 358/133 |
| 4,665,436 | 5/1987 | Osborne et al. | 358/136 |
| 4,675,733 | 6/1987 | Tanimoto | 358/138 |
| 4,700,361 | 10/1987 | Todd et al. | 375/27 |

Primary Examiner—James J. Groody
Assistant Examiner—John K. Peng
Attorney, Agent, or Firm—Thomas Adams

[57] ABSTRACT

A video codec is used to reduce the bandwidth of a video signal for storage and/or transmission. To transmit an uncoded quality color NTSC television signal is digitized form requires channel bandwidth typically 90-120 Mb/s for the signal in the composite format and 216 Mb/s for the signal in the component format. The proposed video codec achieves a reduction of the required transmission bandwidth by a factor of 2-3 by splitting the imput signal into two channels, a main and a complementary channel, and by applying different coding techniques in each. In the main channel the input signal is subsampled and DPCM encoded using a fixed-rate companded quantization, whereas VWL and block coding is used to encode the complementary channel carrying the interpolation error signal. This arrangement seeks to ensure high picture quality while being easily adaptable to different transmission rates and signal formats. In bandwidth-on-demand applications the main channel cna be used alone to provide a lesser quality signal, for example CATV quality at 35 Md/s, with an attendant reduction in system complexity.

44 Claims, 11 Drawing Sheets

TWO-CHANNEL CODING OF DIGITAL SIGNALS

FIELD OF THE INVENTION

The invention relates to digital signal coding, and is applicable to coding of digitized colour video signals for storage and/or transmission. The invention is applicable especially, but not exclusively, to broadcast television signals in composite or component format.

BACKGROUND OF THE INVENTION

To transmit an uncoded broadcast quality colour NTSC television signal in digitized form requires a channel bandwidth of, typically, 90–120 Mb/s for the signal in the composite format and 220 Mb/s for the signal in the component format. These raw bit rates are based on the practice of quantizing the broadcast video signal with 8/9 bits, and sampling the composite NTSC signal at $4f_{sc} = 14.3$ MHz (four times the subcarrier frequency) and the component signal at 13.5 MHz in agreement with the CCIR recommendation 601. It is economically advantageous to reduce the signal's bandwidth substantially, especially to fit existing or proposed transmission standards in various countries. For example, reduced bit rates of 45, 90, and 135 Mb/s may be preferred, representing multiples of the DS-3 bit rate within the North American hierarchy of digital transmission channels. In Europe, standard channel bit rates of 34 and 140 Mb/s, for example, are used.

An object of the present invention is to provide a coding arrangement which gives high picture quality while being adaptable to different sampling rates and signal formats.

BRIEF SUMMARY OF THE INVENTION

According to the present invention, a coding arrangement provides from a digitized video signal two discrete digital signals, i.e. a main signal and a complementary signal, at the transmitter, with a different coding technique applied to each. The two signals may be multiplexed at the transmitter output for transmission, demultiplexed at the receiver input and recombined at the receiver output.

An advantage of this coding arrangement is that the first or main signal can deliver a basic picture quality while its deficiencies can be compensated for at the receiver with the information contained in the second or complementary signal. The latter may, for example, be the interpolation error between the original values of pels (picture elements) dropped prior to transmission and their reconstructed values at the receiver.

In a preferred embodiment, the first or main signal is subsampled and subjected to differential pulse code modulation (DPCM) coupled with fixed-rate companded quantization. The second or complementary signal is subjected to uniform quantization, variable word length (VWL) encoding and block encoding.

If the optimum picture quality is needed, the two signals may be combined at the receiver. It is possible, however, to use only the first or main signal, with consequent bandwidth reduction, if some reduction of picture quality can be tolerated. For example, both signals might give a 45 Mb/s broadcast quality television signal, whereas the first or main signal alone might be sufficient for CATV quality at 34 Mb/s. The bandwidth relinquished by omitting the second or complementary signal could be used for other purposes. Such an arrangement is of particular advantage for "bandwidth-on-demand" applications and also for transmission at bit rates complying with different hierarchical standards, enabling, for example, one coding scheme to satisfy North American, European and Japanese requirements.

BRIEF DESCRIPTION OF THE DRAWINGS

An embodiment of the invention will now be described by way of example only and with reference to the accompanying drawings, in which.

DETAILED DESCRIPTION OF A SPECIFIC EMBODIMENT

Figure 1:
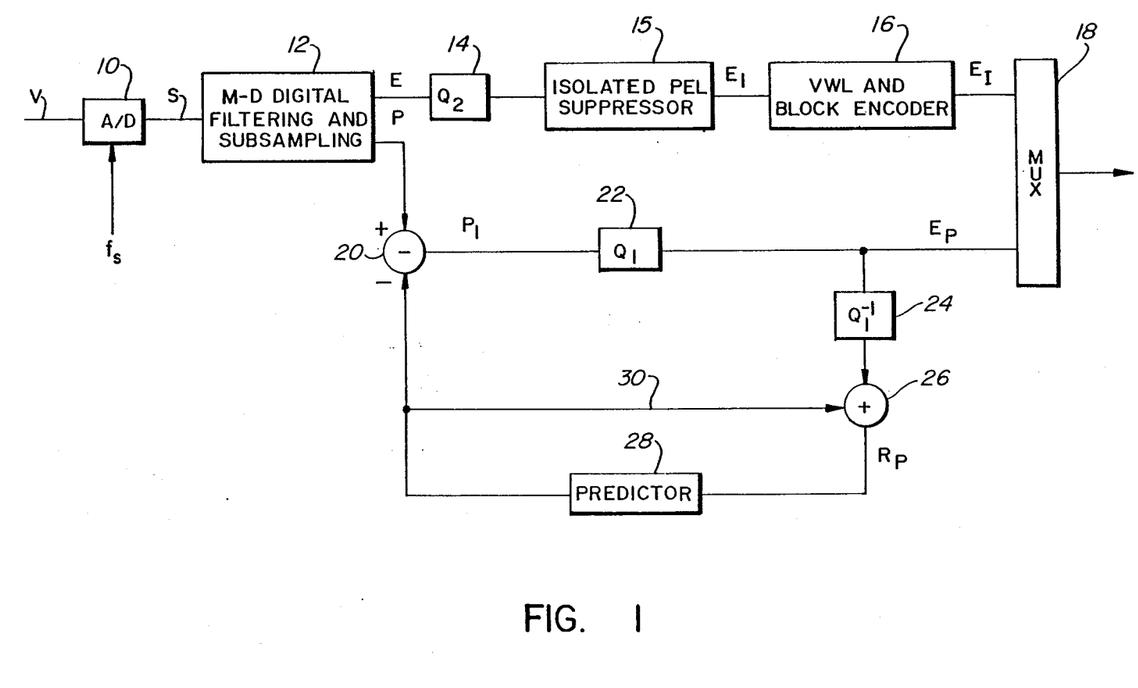
FIG. 1 is a block diagram of a two-channel encoder.
Figure 8:
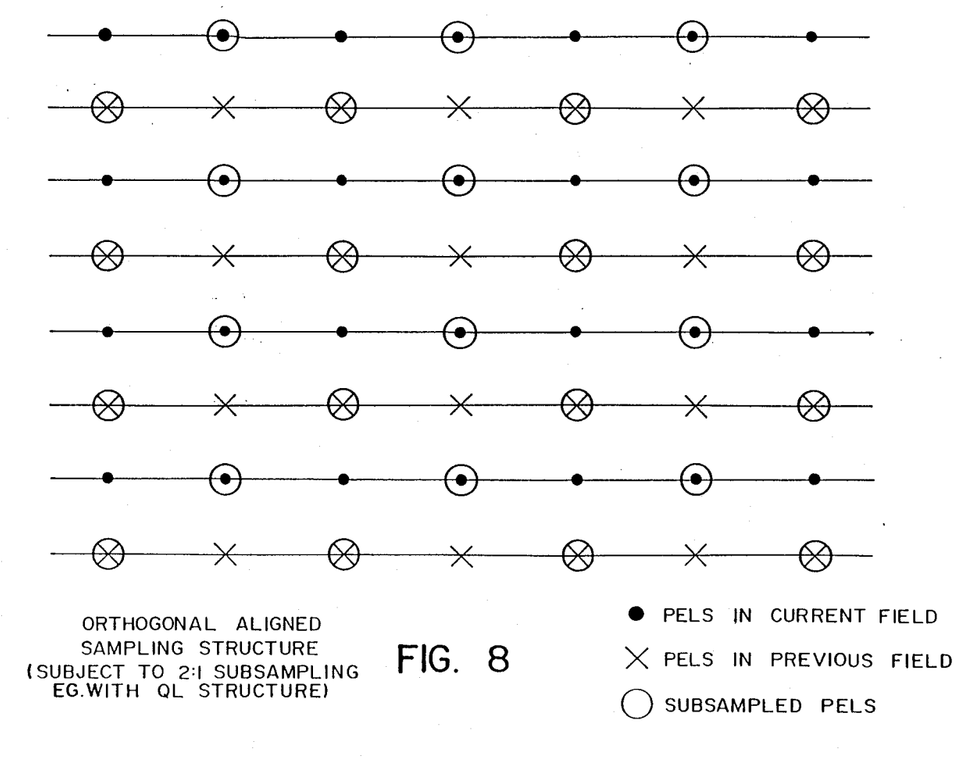
FIGS. 8, 9, 10 and 11 are the sampling pattern and subsampling patterns for signal processing the transmitter and receiver.

Referring to FIG. 1, apparatus for two-channel encoding of colour video signals, referred to herein as a transmitter, comprises an input terminal to which is applied a signal V to be encoded. The signal is digitized by an A/D converter 10 wherein it is sampled with sampling frequency $f_s$ and amplitude accuracy $B_A$. The sampling frequency may be line-locked or subcarrier-locked, in either case resulting in a signal S that has been sampled on an orthogonal aligned three-dimensional (3D) sampling structure as illustrated in FIG. 8. The two signals E and P leave by different paths. The main (first), signal P, comprises input pels obtained in the 2:1 subsampling means 56. Samples, hereafter referred to as subsampled pels, are selected from the initial orthogonal structure in a systematic three-dimensional arrangement. The subsampled pels, collectively referred to as the subsampling structure $S_{PAT}$, are shown encircled in FIG. 8 (by way of example). They are subsequently processed in the main channel (the associated signal path) by a DPCM encoder (to be described later).

Figure 3:
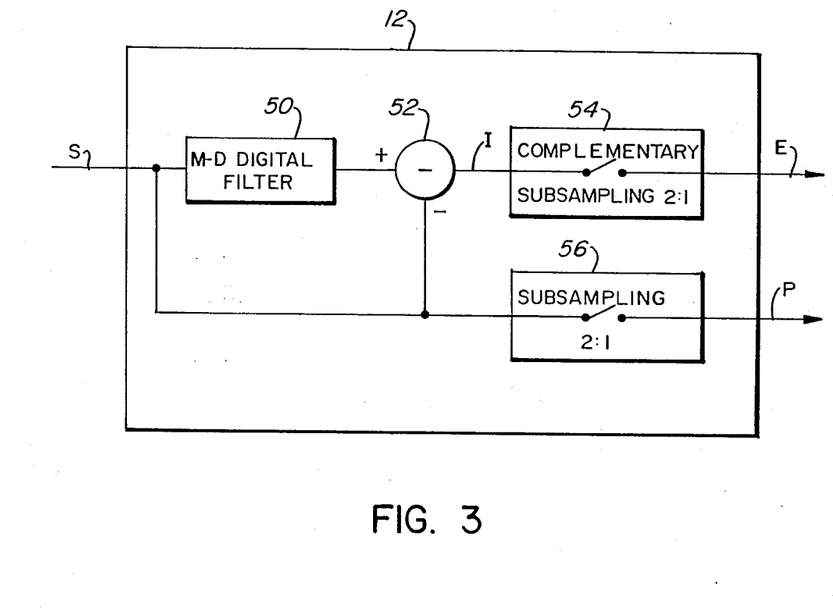
FIG. 3 shows a multi-dimensional filter and subsampler, which are part of the encoder.

Referring to FIG. 3, the complementary signal E, which emerges on a different path, is derived by forming a difference between the input pels omitted in the subsampling means 56 (and not encircled in FIG. 8) and their interpolated values. The interpolated values are obtained as a response of a multi-dimensional filter 50 to the input signal. For general principles of operation of such a multi-dimensional filter, the reader is directed to the text by D. E. Dudgeon and R. M. Mersereau entitled "Multidimensional Digital Signal Processing", 1984, published by Prentice Hall Inc., which is incorporated herein by reference. Details of operation will be apparent from the examples provided.

Referring again to FIG. 3, multi-dimensional filter 50 is of the interpolative kind, i.e. it operates on the subsampled pels only when producing a response for the omitted pels while leaving the subsampled pels intact, i.e. the filter response at the locations of subsampled pels is identical to the original values of those pels. Subtractor 52 provides the difference between the interpolated values at the output of the filter 50 and the input signal S applied to the input of filter 50. The difference signal furnished by subtractor 52 contains zeros in the subsampled-pel locations and non-zero interpolation error values in the remaining locations. The zeros are removed from signal E by the complementary subsampling means 54. Identical results are obtained if subsampling precedes interpolation and differencing as shown in the equivalent structure of FIG. 7. It is an implementational concern that the multi-dimensional filter operates now on the subsampled pels only.

Referring again to FIG. 1, signal E, which constitutes interpolation error, passes through a quantizer 14, isolated pel suppressor 15, and variable word length (VWL) and block encoder 16 to emerge as signal $E_I$ coded at $B_I$ bits per second for application to multiplexer 18. The code for the variable word length encoder is shown in Table 1, which is appended hereto. For details of the construction and operation of such a VWL encoder the reader is referred to U.S. patent application Ser. No. 551,145, filed Nov. 14, 1983, now U.S. Pat. No. 4,568,916, naming O. Bahgat as inventor, and which is incorporated herein by reference.

Quantizer 14 is a uniform or mildly companded quantizer. It maps input decision ranges into output indices. For details of quantizer 14 see Table 4, which is appended hereto. The isolated pel suppressor 15 uses a sliding window to determine whether to set the current output of quantizer 14 to zero based on it being below a threshold and neighbouring indices on both sides of the current position being zero. The block encoder in means 16 segments the quantized interpolation error into two-dimensional blocks of $N_h \times N_v$ samples each. A constant overhead of 1 bit per block is assigned to indicate whether the block contains significant pels or insignificant pels. Only blocks containing at least one significant error are fed to the VWL coder. Construction and operation of a suitable block encoder are well-known and disclosed, for example, by D. J. Connor, R. F. W. Peace and W. G. Scholes, in "Television Coding Using Two-Dimensional Spatial Prediction", Bell System Technical Journal, Vol. 50, No. 3, pp 1049–1061, March 1971, which is incorporated herein by reference.

Figure 4:
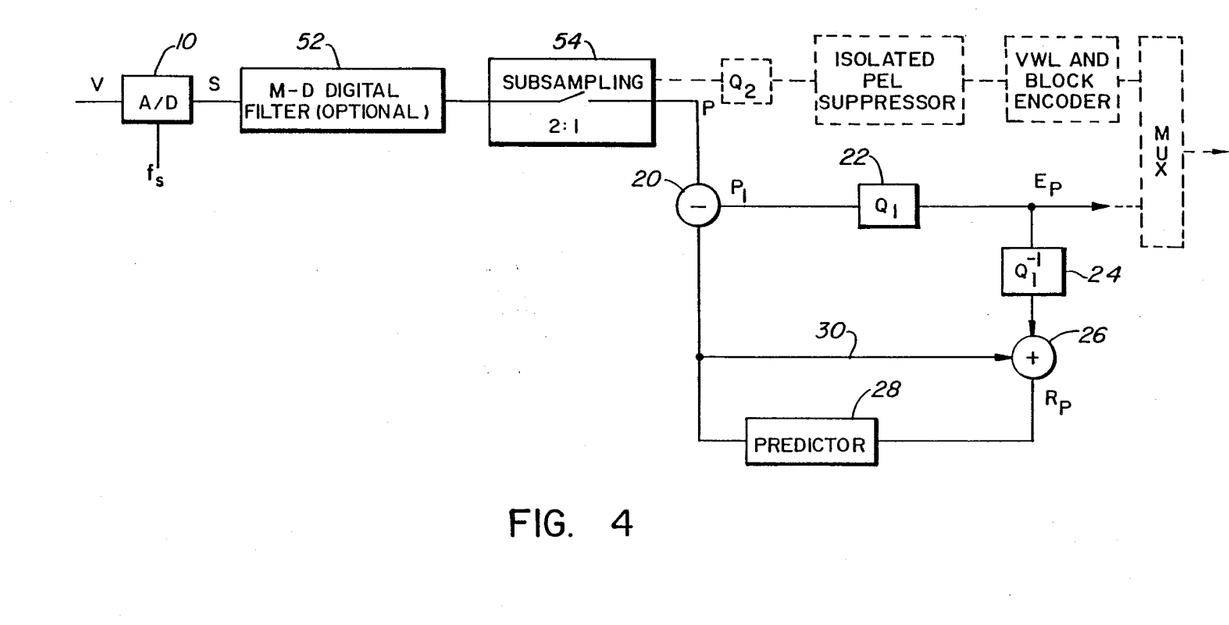
FIG. 4 is a block diagram of the components involved in single channel operation of the encoder.

As mentioned previously, signal P passes through the differential pulse code modulation (DPCM) encoder in reaching multiplexer 18. As shown in FIG. 4, the DPCM encoder comprises subtractor 20, quantizer 22, inverse quantizer 24, adder 26, predictor 28 and a feedback loop 30 from the output of predictor 28 to the adder 26. For details of the quantizer Q, see Tables 2, 3 and 5, appended hereto. The operation of the DPCM coder is known per se and so will not be described in detail here. Typical construction and operation of such coders are described in U.S. Pat. No. 2,605,361, issued July 1952 naming C. C. Cutler as inventor, the article by D. J. Connor et al mentioned above, and an article by H. G. Musmann, entitled "Predictive Image Coding", in Advances in Electronics and Electron Physics, Academic Press, Vol. Suppl. 12, pp. 73–112, 1979. These documents are incorporated herein by reference.

The output $E_p$ of the DPCM coder, taken from quantizer 22, is applied to the multiplexer 18 at the rate of $B_p$ bits per second. The output of the multiplexer is therefore a multiplexed signal with $B_I + B_p$ bandwidth.

Figure 2:
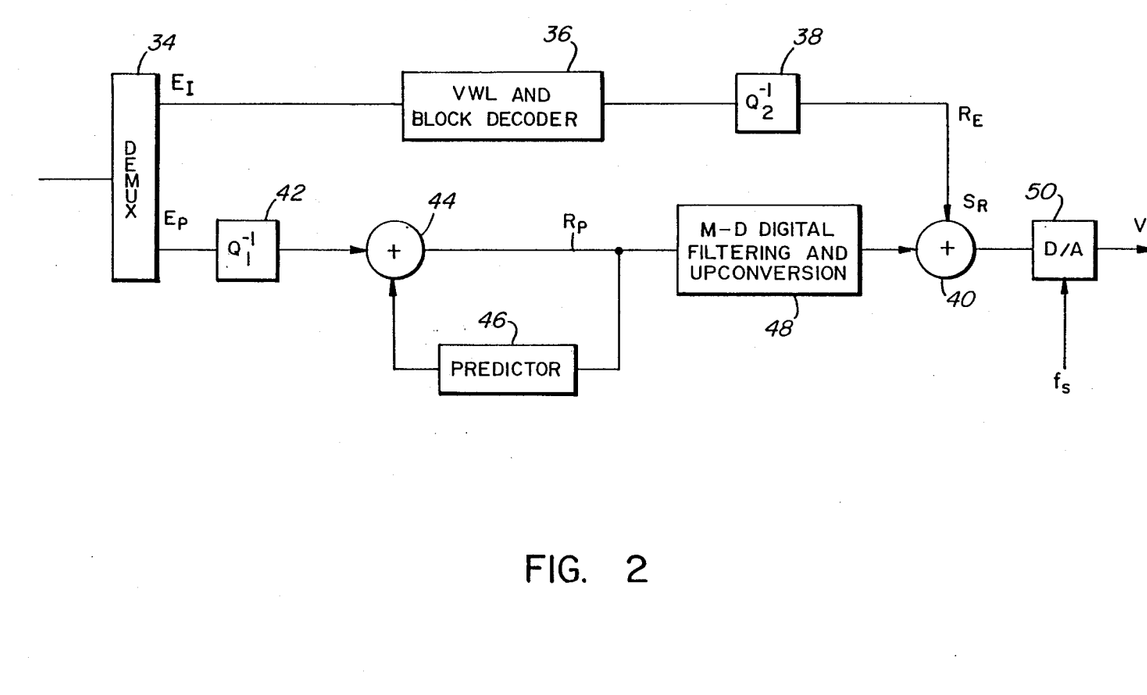
FIG. 2 is a block diagram of a matching decoder.

Referring to FIG. 2, which is the block diagram of the receiver or decoder, the multiplexed signal, presumably having passed through a transmission channel, is applied to a demultiplexer 34 separating it into two signals, $E_I$ and $E_p$, corresponding to signals $E_I$ and $E_p$, respectively, in the transmitter prior to multiplexing. In the case of error-free transmission, $E_I$ and $E_p$ will be the same in both the transmitter and the receiver. Accordingly, and for simplicity, the same reference letters $E_I$ and $E_p$ have been used in both. The interpolation error signal $E_I$ is applied to VWL and block decoder means 36 and thence to inverse quantizer 38, which is the inverse of quantizer 14 in FIG. 1. The output of the inverse quantizer 38 is the reconstituted interpolation error signal $R_E$ which is applied to an adder 40. For details of the construction and operation of a suitable VWL decoder the reader is directed to U.S. patent application Ser. No. 551,087, filed Nov. 14, 1983, now U.S. Pat. No. 4,580,129, naming O. Bahgat as inventor, and which is incorporated herein by reference. For details of the construction and operation of a suitable block decoder, the reader is directed to the aforementioned disclosure by D. J. Connor et al, which is incorporated herein by reference.

The second, predictive, signal $E_p$ is passed through a DPCM decoder comprising inverse quantizer 42, identical to the inverse quantizer 24 in FIG. 1, adder 44, and predictor 46. The reconstituted signal $R_p$, indicated likewise in the transmitter in FIG. 1, undergoes upconversion by zero insertion, then is applied to three-dimensional filtering and upconversion means 48. Upconversion is a reverse process to the subsampling process in that additional samples are inserted into the signal at the complementary pel locations. In filtering and upconversion means 48, the upconverted signal is applied to a multi-dimensional filter identical to the multi-dimensional filter in the transmitter except for a gain factor of 2 in order to recover DC. The receiver filter leaves the subsampled pels unchanged while interpolating the inserted zero-valued samples. The output of the filter is supplied to adder 40 which adds the interpolation error $R_E$ to the interpolated samples only. The output of the adder 40 represents the reconstructed video signal for application to D/A converter 50.

Embodiments of the invention can readily be configured for different bit rates of the input signal, types of signal and sampling rates. Examples of typical configurations follow:

EXAMPLE NO. 1 predictive path bit rate $B_p$: 34–36 Mb/s
interpolative path bit rate $B_I$: 6 Mb/s
output bit rate $B_p + B_I + B_{OVRHD}$: 44–47 Mb/s
input: composite colour NTSC signal
sampling frequency $f_s$: $4f_{sc}$ (14.3 MHz, sub-carrier locked)
amplitude accuracy $B_A$: 8/9 bits
predictive path quantizer $Q_1$: 6-bit companded quantizer (see Table 2)
interpolative path quantizer $Q_2$: uniform quantizer with step 3
N.B. Discrepancies between $B_p + B_I$ and total bit rates are accounted for by overhead $B_{OVRHD}$ such as forward error correction, markers, framing, etc.

Figure 9:
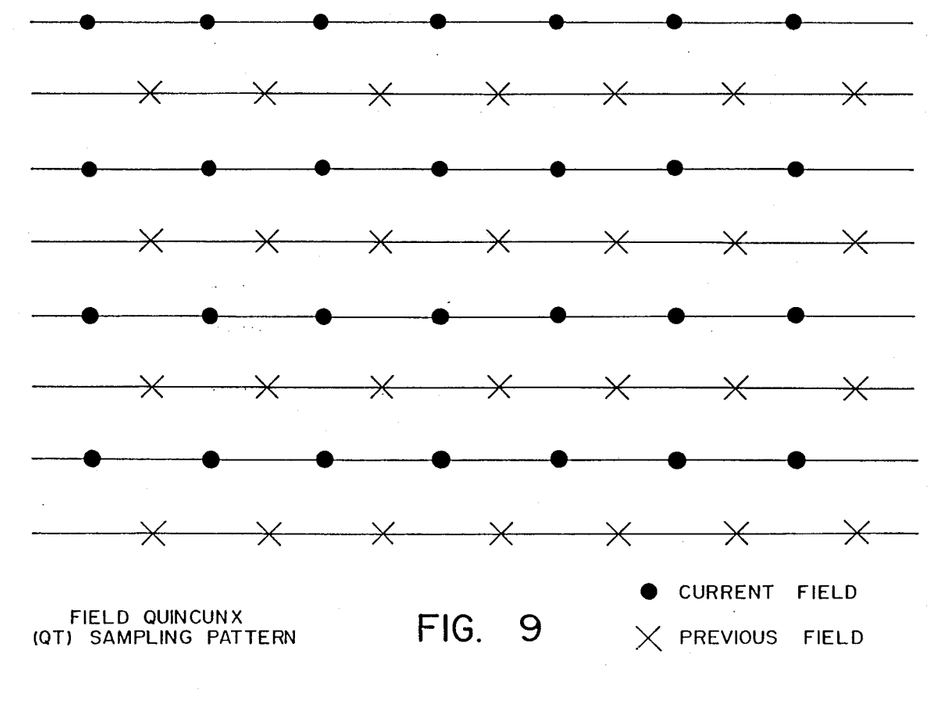

SUB-EXAMPLE NO. 1 sampling pattern $S_{PAT}$: field quincunx QT (FIG. 9)
multi-dimensional filter: 3-D filter requiring one or two field stores, equivalent to a 2-D filter operating in the 45°-plane with respect to the vertical-temporal plane:

$$h_1(n) = \begin{bmatrix} 0 & -8 & 0 & 16 & 0 & -8 & 0 \\ 1 & 0 & 15 & 1 & 15 & 0 & 1 \end{bmatrix}$$

$$h_2(n) = \begin{bmatrix} 0 & -3 & 0 & 6 & 0 & -3 & 0 \\ 1 & 0 & 15 & 32 & 15 & 0 & 1 \\ 0 & -3 & 0 & 6 & 0 & -3 & 0 \end{bmatrix}$$

SUB-EXAMPLE NO. 2 sampling pattern $S_{PAT}$: double checkerboard DCB (see FIG. 9)
multi-dimensional filter: 2-D spatial filter:

$$h(n) = \begin{bmatrix} 0 & -1 & 0 & 6 & 0 & -15 & 0 & 20 & 0 & -15 & 0 & 6 & 0 & -1 & 0 \\ 0 & 0 & 0 & 0 & 0 & 0 & 0 & 0 & 0 & 0 & 0 & 0 & 0 & 0 & 0 \\ 1 & 0 & -5 & 0 & 8 & 0 & 59 & 128 & 59 & 0 & 8 & 0 & -5 & 0 & 1 \\ 0 & 0 & 0 & 0 & 0 & 0 & 0 & 0 & 0 & 0 & 0 & 0 & 0 & 0 & 0 \\ 0 & -1 & 0 & 6 & 0 & -15 & 0 & 20 & 0 & -15 & 0 & 6 & 0 & -1 & 0 \end{bmatrix}$$

Figure 7:
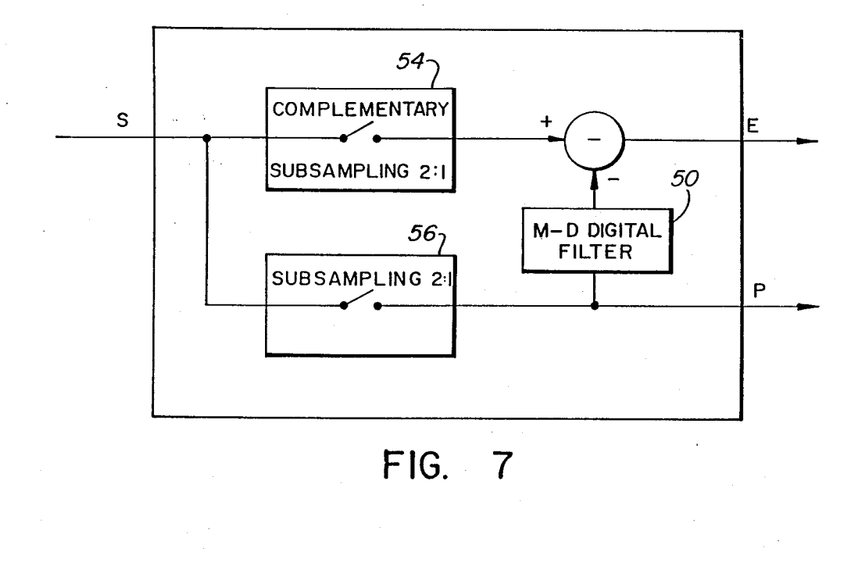
FIG. 7 shows the modified multi-dimensional filter and subsampler.

EXAMPLE NO. 2 predictive path bit rate $B_p$: 31–33 Mb/s
interpolative path bit rate $B_p$: 9–12 Mb/s
output bit rate $B_p+B_I+B_{OVRHD}$: 44–47 Mb/s
input: composite colour NTSC signal
sampling frequency $f_s$: 13.5 MHz (line locked)
amplitude accuracy $B_A$: 8/9 bits
predictive path quantizer $Q_1$: 6-bit companded quantizer (see Table 2)
interpolative path quantizer $Q_2$: uniform quantizer with step 3
sampling pattern $S_{PAT}$: field quincunx QT (see FIG. 7)
multi-dimensional filter: 3-D filter requiring one field store, equivalent to a 2-D filter operating in the 45°-plane with impulse response:

$$h_2(n) = \begin{bmatrix} 0 & -3 & 0 & 6 & 0 & -3 & 0 \\ 1 & 0 & 15 & 32 & 15 & 0 & 1 \\ 0 & -3 & 0 & 6 & 0 & -3 & 0 \end{bmatrix}$$

Figure 10:
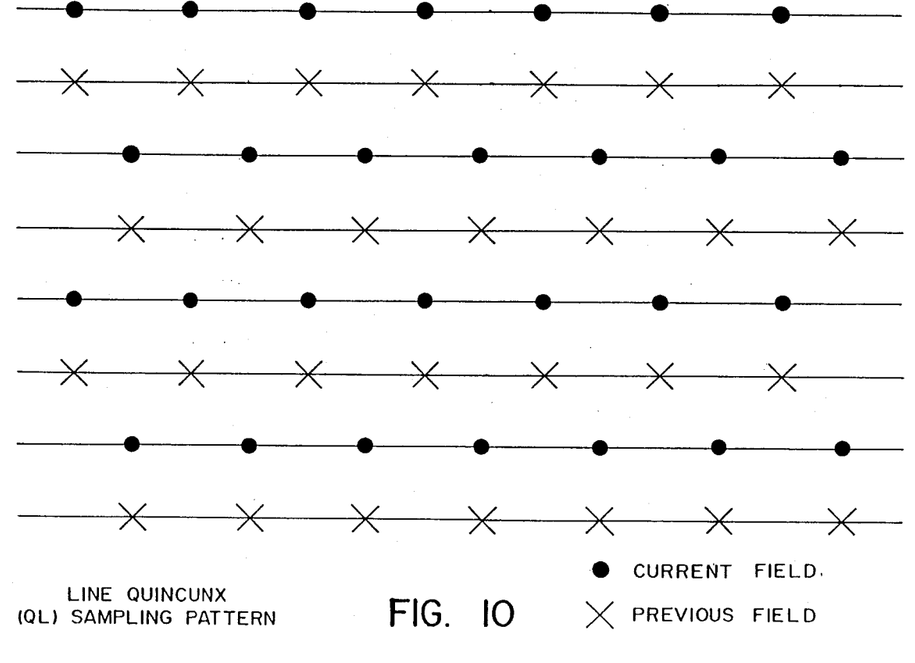
Figure 11:
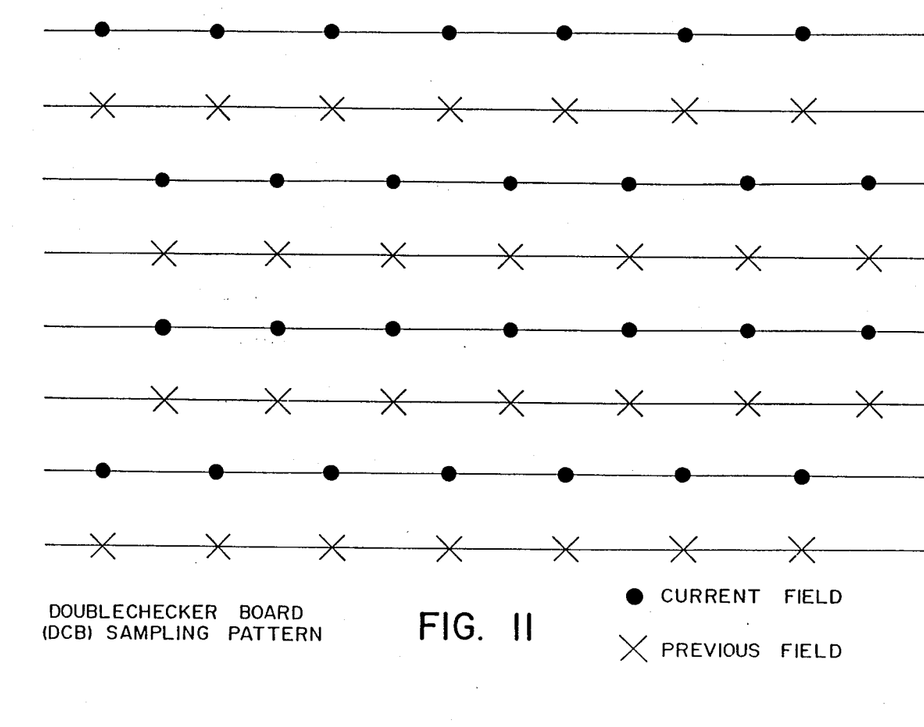

EXAMPLE NO. 3 predictive path bit rate $B_p$: 63–70 Mb/s
interpolative path bit rate $B_I$: 60–65 Mb/s
output bit rate $B_p+B_I+B_{OVRHD}$: 135 Mb/s
input: component 4:2:2 studio standard (Y,R-Y,B-Y) signal
sampling frequency $f_s$: 13.5 MHz (line locked)
sampling pattern $S_{PAT}$: checkerboard (line quincunx) QL (see FIG. 10)
amplitude accuracy $B_A$: 8 bits
predictive path quantizer $Q_1$: 6-bit companded quantizer (see Table 3)
interpolative path quantizer $Q_2$: mildly companded quantizer with thresholding (see Table 4)
multi-dimensional filter: 2-D spatial filter:

$$h(n) = \begin{bmatrix} 0 & -3 & 0 & 6 & 0 & -3 & 0 \\ 1 & 0 & 15 & 32 & 15 & 0 & 1 \\ 0 & -3 & 0 & 6 & 0 & -3 & 0 \end{bmatrix}$$

EXAMPLE NO. 4 predictive path bit rate $B_p$: 50–60 Mb/s
interpolative path bit rate $B_I$: 24–20 Mb/s
output bit rate $B_p+B_I+B_{OVRHD}$: 90 Mb/s
input: component 4:2:2 studio standard (Y,R-Y,B-Y) signal
sampling frequency $f_s$: 13.5 MHz (line locked)
sampling pattern $S_{PAT}$: checkerboard (line quincunx) (see FIG. 10)
amplitude accuracy $B_A$: 8/9 bits
predictive path quantizer $Q_1$: 5-bit companded quantizer (see Table 5)
interpolative path quantizer $Q_2$: mildly companded quantizer with thresholding (see Table 4)
multi-dimensional filter: 2-D spatial filter:

$$h(n) = \begin{bmatrix} 0 & -3 & 0 & 6 & 0 & -3 & 0 \\ 1 & 0 & 15 & 32 & 15 & 0 & 1 \\ 0 & -3 & 0 & 6 & 0 & -3 & 0 \end{bmatrix}$$

Figure 6:
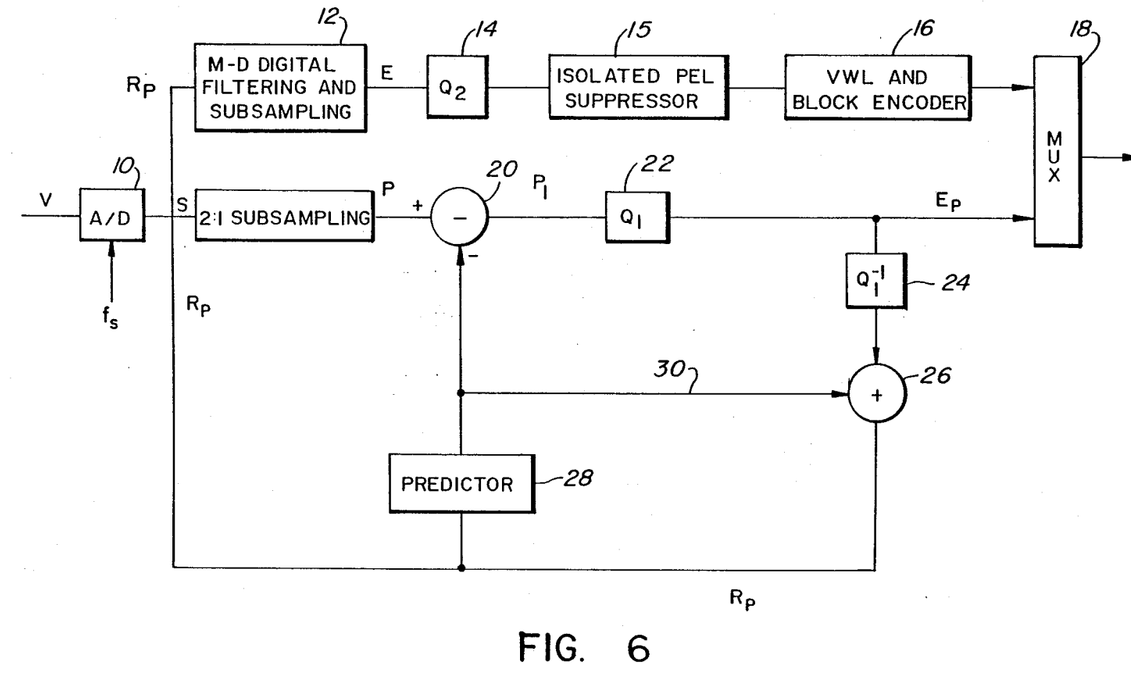
FIG. 6 is a block diagram of a modified two-channel encoder.

In the embodiment of the invention depicted in FIG. 1 the complementary path for coding signal E is based on the response of the multi-dimensional filter 50 operating on the input signal. The present invention encompasses another embodiment, to be considered a variation on that of FIG. 1, which is shown in FIG. 6. The previous arrangement is reconfigured such that the interpolative or complementary signal E is obtained by differencing the reconstructed $R_p$ signal with the output of filter 50, followed by complementary subsampling in means 54, which is part of the filtering and subsampling means 12. 2:1 subsampling means 56 is shown, in FIG. 6, separate from means 12. The input signal S is applied directly to its input and its output provides the main signal P. Otherwise, the remaining processing is identical.

A significant advantage of embodiments of the present invention is that the two channels can be used together to give a high quality signal using the total bandwidth. The coding deficiencies in the main or predictive path can be compensated for by the information supplied by the complementary path.

More particularly, the deficiencies of image quality in the main path arise from the information loss due to a 2:1 subsampling process. This process generally results in a loss of high spatio-temporal frequency content as well as an injection, known as aliasing, of high frequencies into low frequency areas. Aliasing generally appears as an interference pattern objectionable to the viewer. The complementary path preserves, to a large extent, the information lost during subsampling in the main path. Hence it carries a signal consisting mostly of the input signal's high spatio-temporal frequencies as well as an anti-alias signal, i.e., one which removes the alias signal embedded in the main path. It stands to reason that recombining the complementary channel with the main channel at the receiver has the effect of improving picture quality relative to that provided by the main channel alone.

Advantageously, one channel may be used alone to give a signal of lesser quality using only a part of the total bandwidth. Moreover, the remaining bandwidth, released by the other signal, can be used for other purposes. It is particularly envisaged that one channel be capable of supplying CATV quality signals at 35 Mb/s, while the two together would be capable of broadcast quality at 45–47 Mb/s. The main channel carries information from which the input picture, albeit somewhat distorted, can be reconstructed. From the information carried in the complementary channel only the interpolation error can be reconstructed, which cannot reconstitute a picture.

Figure 5:
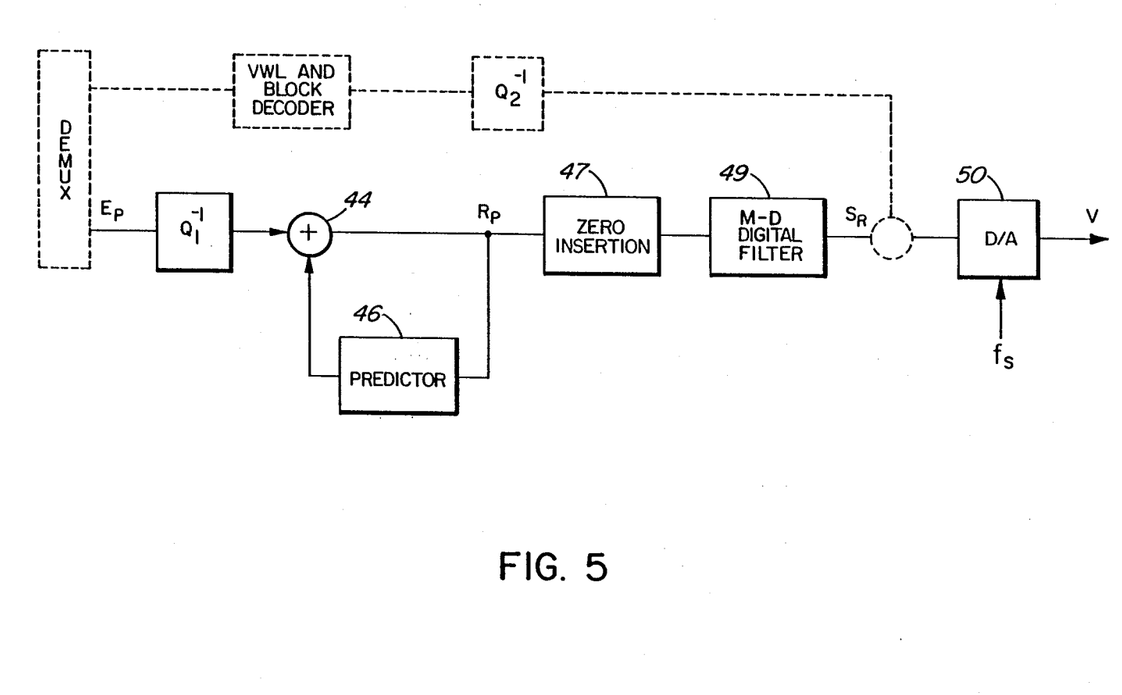
FIG. 5 is a corresponding block diagram of the matching decoder for single channel operation.

FIGS. 4 and 5 illustrate single-channel mode of operation, the unused components being shown with broken lines. Referring to FIG. 4, which corresponds to the predictor channel of FIG. 1, every sample of signal S, digitized in a similar manner as in FIG. 1, is applied to optional multi-dimensional filter 52, and subsequently subsampled by means 54 according to a 2:1 sampling pattern $S_{PAT}$ producing signal P. Leaving filter 52 out effects a gain in apparatus simplicity at the expense of some picture quality loss due to signal alias introduced in the subsampling process. The ensuing processing is identical to that in the predictive path in FIG. 1, therefore its description will be omitted. The main simplification of the single-channel mode is that the interpolative path, and the associated apparatus, is not used. Hence prediction error signal $E_p$ is fed directly to a channel interface. Another difference is that the subsampled pels are subject to the bandlimiting effect of the multi-dimensional filter 52.

In the single-channel decoder, shown in FIG. 5, the simplification consists in the non-use of the interpolative channel and demultiplexer. The predictive signal $E_p$ is reconstituted as signal $R_p$ in the same manner as in the predictive channel of the two-channel decoder (FIG. 2). Thence it is upconverted to a full resolution in a 2:1 zero insertion processor 47. The full resolution digitized image $S_R$ is reconstructed when the zero-valued inserted samples are interpolated by the digital filter 49, identical to 52 except for scaling factor of 2. This signal is applied to D/A processor 50 to obtain the analog video signal V at the output.

Although the specific embodiments refer to a three-dimensional filter, the invention relates generally to video codecs employing multi-dimensional filters.

In this specification, the term "sampling" may cover one stage or more stages.

Two-stage sampling and subsampling using means 10 and means 12 is preferred but a single stage of sampling could be done instead. Then A/D conversion would be employed in both cases—generation of the main signal and of the complementary signal.

TABLE 1

| quantizer index | code | code length |
|---|---|---|
| . | . | . |
| . | . | . |
| . | . | . |

TABLE 1-continued

| quantizer index | code | code length |
|---|---|---|
| 8 | 1000000001 | 10 |
| 7 | 100000001 | 9 |
| 6 | 10000001 | 8 |
| 5 | 1000001 | 7 |
| 4 | 100001 | 6 |
| 3 | 10001 | 5 |
| 2 | 1001 | 4 |
| 1 | 101 | 3 |
| 0 | 0 | 1 |
| −1 | 111 | 3 |
| −2 | 1101 | 4 |
| −3 | 11001 | 5 |
| −4 | 110001 | 6 |
| −5 | 1100001 | 7 |
| −6 | 11000001 | 8 |
| −7 | 110000001 | 9 |
| −8 | 1100000001 | 10 |
| . | . | . |
| . | . | . |
| . | . | . |

Variable-word-length code for coding of interpolation error

TABLE 2

| | 8-bit input | | 9-bit input | |
|---|---|---|---|---|
| index | decision range | rep level | decision range | rep level |
| 0 | 0-0 | 0 | 0-1 | 0 |
| 1 | 1-1 | 1 | 2-3 | 2 |
| 2 | 2-2 | 2 | 4-5 | 4 |
| 3 | 3-3 | 3 | 6-7 | 6 |
| 4 | 4-4 | 4 | 8-9 | 8 |
| 5 | 5-5 | 5 | 10-11 | 10 |
| 6 | 6-6 | 6 | 12-13 | 12 |
| 7 | 7-9 | 8 | 14-19 | 16 |
| 8 | 10-12 | 11 | 20-25 | 22 |
| 9 | 13-15 | 14 | 26-31 | 28 |
| 10 | 16-18 | 17 | 32-37 | 34 |
| 11 | 19-21 | 20 | 38-43 | 40 |
| 12 | 22-24 | 23 | 44-49 | 46 |
| 13 | 25-29 | 27 | 50-59 | 52 |
| 14 | 30-34 | 32 | 60-69 | 64 |
| 15 | 35-39 | 37 | 70-79 | 72 |
| 16 | 40-44 | 42 | 80-89 | 84 |
| 17 | 45-49 | 47 | 90-99 | 94 |
| 18 | 50-56 | 53 | 100-113 | 106 |
| 19 | 57-63 | 60 | 114-127 | 120 |
| 20 | 64-70 | 67 | 128-141 | 134 |
| 21 | 71-79 | 75 | 142-159 | 150 |
| 22 | 80-88 | 84 | 160-177 | 168 |
| 23 | 89-99 | 94 | 178-199 | 188 |
| 24 | 100-110 | 105 | 200-221 | 210 |
| 25 | 111-123 | 117 | 222-247 | 234 |
| 26 | 124-136 | 130 | 248-273 | 260 |
| 27 | 137-151 | 144 | 274-303 | 288 |
| 28 | 152-168 | 160 | 304-337 | 320 |
| 29 | 169-187 | 178 | 338-375 | 356 |
| 30 | 188-208 | 197 | 376-407 | 394 |
| 31 | 209-255 | 231 | 408-511 | 462 |

6-bit symetrical companded quantizer $Q_1$ (positive cycle) for case no. 1

TABLE 3

| | 8-bit input | | 9-bit input | |
|---|---|---|---|---|
| index | decision range | rep level | decision range | rep level |
| 0 | 0 | 0 | −1-1 | 0 |
| 1 | 1 | 1 | 2-3 | 2 |
| 2 | 2 | 2 | 4-5 | 4 |
| 3 | 3 | 3 | 6-7 | 6 |
| 4 | 4 | 4 | 8-9 | 8 |
| 5 | 5 | 5 | 10-11 | 10 |

TABLE 3-continued

| index | 8-bit input decision range | 8-bit input rep level | 9-bit input decision range | 9-bit input rep level |
|---|---|---|---|---|
| 6 | 6 | 6 | 12–13 | 12 |
| 7 | 7 | 7 | 14–15 | 14 |
| 8 | 8 | 8 | 16–17 | 16 |
| 9 | 9 | 9 | 18–19 | 18 |
| 10 | 10–12 | 11 | 20–25 | 22 |
| 11 | 13–15 | 14 | 26–31 | 28 |
| 12 | 16–18 | 17 | 32–37 | 34 |
| 13 | 19–21 | 20 | 38–43 | 40 |
| 14 | 22–24 | 23 | 44–49 | 46 |
| 15 | 25–27 | 26 | 50–55 | 52 |
| 16 | 28–30 | 29 | 56–61 | 58 |
| 17 | 31–35 | 33 | 62–71 | 66 |
| 18 | 36–40 | 38 | 72–81 | 76 |
| 19 | 41–45 | 43 | 82–91 | 86 |
| 20 | 46–50 | 48 | 92–101 | 96 |
| 21 | 51–55 | 53 | 102–111 | 106 |
| 22 | 56–62 | 59 | 112–125 | 118 |
| 23 | 63–69 | 66 | 126–139 | 132 |
| 24 | 70–76 | 73 | 140–153 | 146 |
| 25 | 77–83 | 80 | 154–167 | 160 |
| 26 | 84–92 | 88 | 168–185 | 176 |
| 27 | 93–101 | 97 | 186–203 | 194 |
| 28 | 102–110 | 106 | 204–221 | 212 |
| 29 | 111–121 | 116 | 222–243 | 232 |
| 30 | 122–134 | 128 | 244–269 | 256 |
| 31 | 135–510 | 150 | 270–510 | 300 |

6-bit symetrical companded quantizer $Q_1$ (positive cycle) for case no. 3

TABLE 4

| index | 8-bit input decision range | 8-bit input rep level | 9-bit input decision range | 9-bit input rep level |
|---|---|---|---|---|
| 0 | −5–5 | 0 | −9–9 | 0 |
| 1 | 6–10 | 8 | 10–18 | 14 |
| 2 | 11–15 | 13 | 19–27 | 23 |
| 3 | 16–22 | 19 | 28–40 | 34 |
| 4 | 23–29 | 26 | 41–53 | 47 |
| 5 | 30–38 | 34 | 54–70 | 62 |
| 6 | 39–49 | 44 | 71–91 | 81 |
| 7 | 50–62 | 56 | 92–116 | 104 |
| 8 | 63–77 | 70 | 117–145 | 131 |
| 9 | 78–94 | 86 | 146–178 | 162 |
| 10 | 95–113 | 104 | 179–215 | 197 |
| 11 | 114–134 | 124 | 216–256 | 236 |
| 12 | 135–155 | 145 | 257–297 | 277 |
| 13 | 156–176 | 166 | 298–338 | 318 |
| 14 | 177–197 | 187 | 339–379 | 359 |
| 15 | 198–511 | 208 | 380–511 | 400 |

Mildly companded quantizer $Q_2$ (positive cycle) used for quantizing interpolation error prior to VWL encoding for case no. 3 and no. 4

TABLE 5

| index | 8-bit input decision range | 8-bit input rep level | 9-bit input decision range | 9-bit input rep level |
|---|---|---|---|---|
| 0 | −1–1 | 0 | −3–3 | 0 |
| 1 | 2–4 | 3 | 4–9 | 6 |
| 2 | 5–7 | 6 | 5–7 | 12 |
| 3 | 8–10 | 9 | 8–10 | 18 |
| 4 | 11–13 | 12 | 11–13 | 24 |
| 5 | 14–16 | 15 | 14–16 | 30 |
| 6 | 17–21 | 19 | 17–21 | 38 |
| 7 | 22–26 | 24 | 22–26 | 44 |
| 8 | 27–31 | 29 | 27–31 | 58 |
| 9 | 32–36 | 34 | 32–36 | 68 |
| 10 | 37–43 | 40 | 37–43 | 80 |
| 11 | 44–50 | 47 | 44–50 | 94 |
| 12 | 51–57 | 54 | 51–57 | 108 |
| 13 | 58–66 | 62 | 58–66 | 124 |

TABLE 5-continued

| index | 8-bit input decision range | 8-bit input rep level | 9-bit input decision range | 9-bit input rep level |
|---|---|---|---|---|
| 15 | 67–510 | 71 | 67–510 | 142 |

5-bit symetrical companded quantizer $Q_1$ (positive cycle) for case no. 4

What is claimed is:

1. Signal processing apparatus comprising an encoder for encoding an analog signal (V) to produce a coded signal, said encoder comprising:
   analog to digital encoder means (10) for sampling the analog signal (V) to provide a digitally encoded signal (S);
   coding means (12) responsive to the output of said encoder means (10) for providing two distinct subsampled digital signals (E, P);
   said coding means (12) including subsampling means (56) for subsampling said digitally encoded signal (S) to provide a subsampled digital signal (P) corresponding to the input signal, and also including filtering and subsampling means (50,52,54) for filtering and subsampling said digitally encoded signal (S) to provide a complementary subsampled signal (E) corresponding to the difference between the digitally encoded signal (S) and a filtered signal derived by filtering the signal (S); and
   first and second coding means (14,15,16; 20,22, 24,26,28,30) for encoding said two distinct signals (E, P) to provide two coded distinct signals ($E_I$, $E_p$) respectively, each of said first and second coding means being operative to encode in a different way to that in which the other encodes.

2. Signal processing apparatus as defined in claim 1, wherein said filtering and subsampling means (50,52,54) for filtering and subsampling said signal comprises:
   multi-dimensional filter means (50) responsive to said digitally encoded signal (S) for producing the filtered signal,
   subtractor means (52) for differencing said digitally encoded signal and the filtered signal to provide an interpolation error signal, and
   complementary sampling means (54) responsive to the output of the subtractor means (52) to provide said complementary subsampled signal.

3. Signal processing apparatus as defined in claim 1, wherein said means (12) serves to sample said digitally encoded signal in a line quincunx pattern to provide said complementary subsampled signal.

4. Signal processing apparatus as defined in claim 1, wherein said means (12) serves to sample said digitally encoded signal in a field quincunx pattern.

5. Signal processing apparatus as defined in claim 1, wherein said means (12) serves to sample said digitally encoded signal in a double checkerboard pattern.

6. Signal processing apparatus as defined in claim 1, wherein said means (10) for sampling said input signal (V) serves to provide an orthogonal aligned sampling structure.

7. Signal processing apparatus as defined in claim 5, wherein said subsampling means (56) serves to subsample said digitally encoded signal in a line quincunx pattern.

8. Signal processing apparatus as defined in claim 6, wherein said subsampling means (56) serves to sample said digitally encoded signal in a field quincunx pattern.

9. Signal processing apparatus as defined in claim 1, wherein said means (12) serves to sample said digitally encoded signal in a double checkerboard pattern.

10. Signal processing apparatus as defined in claim 1, wherein said coding means serves to encode said complementary subsampled signal using variable word length coding and to encode said subsampled digital signal using differential pulse code modulation.

11. Signal processing apparatus as defined in claim 10, wherein said coding means includes a multi-dimensional filter having the response:

$$h(n) = \begin{bmatrix} 0 & -1 & 0 & 6 & 0 & -15 & 0 & 20 & 0 & -15 & 0 & 6 & 0 & -1 & 0 \\ 0 & 0 & 0 & 0 & 0 & 0 & 0 & 0 & 0 & 0 & 0 & 0 & 0 & 0 & 0 \\ 1 & 0 & -5 & 0 & 8 & 0 & 59 & 128 & 59 & 0 & 8 & 0 & -5 & 0 & 1 \\ 0 & 0 & 0 & 0 & 0 & 0 & 0 & 0 & 0 & 0 & 0 & 0 & 0 & 0 & 0 \\ 0 & -1 & 0 & 6 & 0 & -15 & 0 & 20 & 0 & -15 & 0 & 6 & 0 & -1 & 0 \end{bmatrix}$$

12. Signal processing apparatus as defined in claim 1, wherein said encoded means is adapted to encode a composite colour NTSC signal and comprises means for sampling such signal at a sampling frequency that is sub-carrier locked.

13. Signal processing apparatus as defined in claim 12, wherein said coding means includes means for subsampling the digitally encoded signal using a double checkerboard pattern.

14. Signal processing apparatus as defined in claim 12, wherein said coding means includes means for subsampling the digitally encoded signal using a field quincunx subsampling pattern ($S_{PAT}$).

15. Signal processing apparatus as defined in claim 14, wherein said coding means includes a multi-dimensional filter having one of the responses:

$$h_1(n) = \begin{bmatrix} 0 & -8 & 0 & 16 & 0 & -8 & 0 \\ 1 & 0 & 15 & 1 & 15 & 0 & 1 \end{bmatrix}$$

$$h_2(n) = \begin{bmatrix} 0 & -3 & 0 & 6 & 0 & -3 & 0 \\ 1 & 0 & 15 & 32 & 15 & 0 & 1 \\ 0 & -3 & 0 & 6 & 0 & -3 & 0 \end{bmatrix}$$

16. Signal processing apparatus as defined in claim 13, wherein said encoder is adapted to encode a composite colour NTSC signal and includes means for sampling such signal at a frequency that is line locked.

17. Signal processing apparatus as defined in claim 16, wherein said coding means serves to subsample the signal using a field quincunx pattern.

18. Signal processing apparatus as defined in claim 16, wherein said coding means includes a multi-dimensional filter having the response:

$$h(n) = \begin{bmatrix} 0 & -3 & 0 & 6 & 0 & -3 & 0 \\ 1 & 0 & 15 & 32 & 15 & 0 & 1 \\ 0 & -3 & 0 & 6 & 0 & -3 & 0 \end{bmatrix}$$

19. Signal processing apparatus as defined in claim 16, wherein said coding means serves to subsample the signal using a checkerboard pattern.

20. Signal processing apparatus as defined in claim 1, wherein said coding means is adapted to encode a component colour NTSC signal and includes means for sampling such signal at a frequency that is line locked.

21. Signal processing apparatus as defined in claim 20, wherein said coding means includes means for subsampling the digitally encoded signal using a field quincunx subsampling pattern ($S_{PAT}$).

22. Signal processing apparatus as defined in claim 21, wherein said coding means includes a multi-dimensional filter having one of the responses:

$$h_1(n) = \begin{bmatrix} 0 & -8 & 0 & 16 & 0 & -8 & 0 \\ 1 & 0 & 15 & 1 & 15 & 0 & 1 \end{bmatrix}$$

$$h_2(n) = \begin{bmatrix} 0 & -3 & 0 & 6 & 0 & -3 & 0 \\ 1 & 0 & 15 & 32 & 15 & 0 & 1 \\ 0 & -3 & 0 & 6 & 0 & -3 & 0 \end{bmatrix}$$

23. Signal processing apparatus as defined in claim 20, wherein said coding means includes means for subsampling the digitally encoded signal using a double checkerboard pattern.

24. Signal processing apparatus as defined in claim 23, wherein said coding means includes a multi-dimensional filter having the response:

$$h(n) = \begin{bmatrix} 0 & -1 & 0 & 6 & 0 & -15 & 0 & 20 & 0 & -15 & 0 & 6 & 0 & -1 & 0 \\ 0 & 0 & 0 & 0 & 0 & 0 & 0 & 0 & 0 & 0 & 0 & 0 & 0 & 0 & 0 \\ 1 & 0 & -5 & 0 & 8 & 0 & 59 & 128 & 59 & 0 & 8 & 0 & -5 & 0 & 1 \\ 0 & 0 & 0 & 0 & 0 & 0 & 0 & 0 & 0 & 0 & 0 & 0 & 0 & 0 & 0 \\ 0 & -1 & 0 & 6 & 0 & -15 & 0 & 20 & 0 & -15 & 0 & 6 & 0 & -1 & 0 \end{bmatrix}$$

25. Signal processing apparatus as defined in claim 20, wherein said coding means serves to subsample the signal using a line quincunx pattern.

26. Signal processing apparatus as defined in claim 25, wherein said coding means includes a multi-dimensional filter having the response:

$$h(n) = \begin{bmatrix} 0 & -3 & 0 & 6 & 0 & -3 & 0 \\ 1 & 0 & 15 & 32 & 15 & 0 & 1 \\ 0 & -3 & 0 & 6 & 0 & -3 & 0 \end{bmatrix}$$

27. A signal processing method for encoding an analog signal (V) to produce a coded signal, comprising the steps of:
  sampling the analog signal (V) to provide a digitally encoded signal (S);
  providing two distinct subsampled digital signals (E, P) from the digitally encoded signal (S) including:
  subsampling said digitally encoded signal (S) to provide a subsampled digital signal (P) corresponding to the input signal, and filtering and subsampling said digitally encoded signal (S) to provide a complementary subsampled signal (E) corresponding to the difference between the digitally encoded signal (S) and a filtered signal derived by filtering the signal (S); and
  encoding said two distinct signals (E, P) differently from each other to provide two coded distinct signals ($E_I$, $E_P$), respectively.

28. The signal processing method as defined in claim 27, wherein said filtering and subsampling of said digitally encoded signal comprises:
  employing multi-dimensional filter means to produce from said signal (S) a filtered signal,
  differencing said digitally encoded signal and the filtered signal to provide an interpolated signal, and
  subsampling the interpolated signal obtained by such differencing step to provide the complementary subsampled signal.

29. The signal processing method as defined in claim 27, wherein said step of providing said two distinct signals, includes subsampling said signal (S) to provide said subsampled digital signal (P) of said two distinct signals, using multi-dimensional filter means to provide a filtered signal, complementarily subsampling said signal (S) to provide the complementary subsampled signal (E), such complementary subsampling using a subsampling pattern that is complementary to said subsampling used for said signal (S) and differencing said complementary subsampled signal and said filtered signal to provide said subsampled signal P.

30. A signal processing method as defined in claim 27, including the step of subsampling said digitally encoded signal in a line quincunx pattern to provide said complementary subsampled signal.

31. A signal processing method as defined in claim 27, wherein said subsampling comprises the step of subsampling said digitally encoded signal in a field quincunx pattern.

32. A signal processing method as defined in claim 27, wherein said subsampling comprises the step of subsampling said digitally encoded signal in a double checkerboard pattern.

33. A signal processing method as defined in claim 27, wherein encoding of said complementary subsampled signal uses variable word length coding and encoding of said subsampled digital signal uses differential pulse code modulation.

34. A signal processing method as defined in claim 27, including the step of sampling said input signal (V) using an orthogonal aligned sampling structure.

35. A signal processing method as defined in claim 34, wherein said subsampling comprises the step of subsampling said digitally encoded signal in a line quincunx pattern.

36. A signal processing method as defined in claim 34, wherein said subsampling comprises the step of subsampling said digitally encoded signal in a field quincunx pattern.

37. A signal processing method as defined in claim 34, wherein said subsampling comprises the step of sampling said digitally encoded signal in a double checkerboard pattern.

38. A signal processing method as defined in claim 28, comprising encoding a composite colour NTSC signal and sampling such signal at a sampling frequency that is line locked.

39. A signal processing method as defined in claim 38, wherein subsampling of the digitally encoded signal uses a field quincunx subsampling pattern ($S_{PAT}$).

40. A signal processing method as defined in claim 39, wherein said filtering employs a multi-dimensional filter having one of the responses:

$$h_1(n) = \begin{bmatrix} 0 & -8 & 0 & 16 & 0 & -8 & 0 \\ 1 & 0 & 15 & 1 & 15 & 0 & 1 \end{bmatrix}$$

$$h_2(n) = \begin{bmatrix} 0 & -3 & 0 & 6 & 0 & -3 & 0 \\ 1 & 0 & 15 & 32 & 15 & 0 & 1 \\ 0 & -3 & 0 & 6 & 0 & -3 & 0 \end{bmatrix}$$

41. A signal processing method as defined in claim 38, wherein said subsampling of the digitally encoded signal uses a double checkerboard pattern.

42. A signal processing method as defined in claim 41, wherein said filtering uses a multi-dimensional filter having the response:

$$h(n) = \begin{bmatrix} 0 & -1 & 0 & 6 & 0 & -15 & 0 & 20 & 0 & -15 & 0 & 6 & 0 & -1 & 0 \\ 0 & 0 & 0 & 0 & 0 & 0 & 0 & 0 & 0 & 0 & 0 & 0 & 0 & 0 & 0 \\ 1 & 0 & -5 & 0 & 8 & 0 & 59 & 128 & 59 & 0 & 8 & 0 & -5 & 0 & 1 \\ 0 & 0 & 0 & 0 & 0 & 0 & 0 & 0 & 0 & 0 & 0 & 0 & 0 & 0 & 0 \\ 0 & -1 & 0 & 6 & 0 & -15 & 0 & 20 & 0 & -15 & 0 & 6 & 0 & -1 & 0 \end{bmatrix}$$

43. A signal processing method as defined in claim 38, including subsampling the signal using a line quincunx pattern.

44. A signal processing method as defined in claim 43, wherein said filtering uses a multi-dimensional filter having the response:

$$h(n) = \begin{bmatrix} 0 & -3 & 0 & 6 & 0 & -3 & 0 \\ 1 & 0 & 15 & 32 & 15 & 0 & 1 \\ 0 & -3 & 0 & 6 & 0 & -3 & 0 \end{bmatrix}$$

* * * * *